(12) United States Patent
Gray et al.

(10) Patent No.: US 6,762,577 B2
(45) Date of Patent: Jul. 13, 2004

(54) DC MOTOR SPEED CONTROL SYSTEM

(75) Inventors: Steven Gray, Prospect, KY (US); Wolfgang Daum, Louisville, KY (US); John Steven Holmes, Sellersburg, IN (US); Rollie Richard Herzog, Louisville, KY (US); Mark Robert Mathews, Lombard, IL (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/993,783

(22) Filed: Nov. 14, 2001

(65) Prior Publication Data
US 2003/0090229 A1 May 15, 2003

(51) Int. Cl.[7] ................................................. H02P 7/29
(52) U.S. Cl. ...................... 318/268; 318/432; 388/909
(58) Field of Search ................................. 318/268, 430, 318/431–434, 565, 599; 388/903, 909, 915, 928.1

(56) References Cited

U.S. PATENT DOCUMENTS

| | | | |
|---|---|---|---|
| 2,754,464 A | * 7/1956 | Wizenez et al. | |
| 4,220,902 A | * 9/1980 | Aronsson et al. | 318/434 |
| 4,300,081 A | * 11/1981 | Van Landingham | 318/599 |
| 4,588,934 A | 5/1986 | Suzuki et al. | |
| 4,611,154 A | * 9/1986 | Lambropoulos et al. | 318/490 |
| 4,680,512 A | * 7/1987 | Melocik | 318/139 |
| 4,719,395 A | * 1/1988 | Aoi et al. | 318/545 X |
| 4,851,743 A | * 7/1989 | Schmerda et al. | 388/811 |
| 5,088,297 A | 2/1992 | Maruyama et al. | |
| 5,162,709 A | 11/1992 | Ohi | |
| 5,210,684 A | 5/1993 | Nam | |
| 5,268,987 A | * 12/1993 | Sakoh | 388/819 |
| 5,408,573 A | * 4/1995 | Jamieson et al. | 388/815 |
| 5,589,805 A | 12/1996 | Zuraski et al. | |
| 5,625,542 A | 4/1997 | Stemmler et al. | |
| 6,016,042 A | * 1/2000 | Miura et al. | 318/430 |
| 6,236,175 B1 | * 5/2001 | Mourad et al. | 318/268 |
| 6,316,988 B1 | * 11/2001 | Forehand et al. | 327/538 |
| 6,414,459 B1 | * 7/2002 | Borho et al. | 318/599 |
| 6,509,709 B2 | * 1/2003 | Kubozuka et al. | 318/685 |
| 6,512,346 B2 | * 1/2003 | Yoshimura | 318/599 |

* cited by examiner

Primary Examiner—Bentsu Ro
(74) Attorney, Agent, or Firm—H. Neil Houser; Armstrong Teasdale LLP

(57) ABSTRACT

A method for controlling speed in a pulse-width-modulation-controlled motor powered by a load voltage source is provided. The method includes the steps of measuring the motor load voltage, and setting a pulse-width-modulation duty cycle based on the measured voltage.

50 Claims, 4 Drawing Sheets

DC MOTOR SPEED CONTROL SYSTEM

BACKGROUND OF THE INVENTION

This invention relates generally to motor speed control and, more particularly, to systems for controlling fan motor speed in a refrigerator.

Refrigeration systems typically use a variety of variable speed direct current (DC) fan motors for air movement and cooling. Fan motors and their associated mounting structures, sometimes referred to as fixtures, have mechanical resonance frequencies that are sometimes approximately equal to the frequency (or multiples and sub-multiples thereof) of the driving frequencies utilized in a pulse width modulation (PWM) based system. As a result, the motor will sometimes be modulated at one or more duty cycles which causes increased perceived noise to a consumer.

Additionally, variations in fan noise can be undesirable and the speed of each fan motor in the refrigeration system is typically controlled to facilitate a reduction in noise variations. PWM is a known method for controlling variable-speed DC fan motors in refrigerators. One known PWM based system utilizes a non-regulated DC power supply with an open-loop control that allows motor speed to vary with the alternating current (AC) line voltage. Another known PWM based system achieves a constant fan speed by using a speed feedback sensor, e.g. a Hall effect device, with a non-regulated DC supply. Other known PWM based systems utilize a regulated DC supply or a voltage regulator circuit to achieve a constant motor speed.

However, utilizing a speed feedback sensor can raise manufacturing costs. Additionally, the constant speed obtained using a regulated DC supply can vary from one motor to another motor due to manufacturing variations among the motors, and voltage regulator circuits are costly and typically have an energy efficiency of less than eighty percent.

BRIEF SUMMARY OF THE INVENTION

In one aspect, a method for controlling speed in a pulse-width-modulation-controlled motor powered by a load voltage source is provided. The method comprises the steps of measuring the motor load voltage, and setting a pulse-width-modulation duty cycle based on the measured voltage.

In another aspect, a method for controlling speed in a pulse-width-modulation-controlled motor powered by a load voltage supplied by a supply voltage is provided. The method comprises the steps of diagnosing motor functionality using a difference between the supply voltage and the load voltage, and switching from motor functionality diagnosis to motor speed control.

In another aspect, a closed loop motor control system is provided. The system comprises a motor, a power source, a resistive element electrically coupling said motor to said power source, at least one switching element electrically coupling said motor to said power source in parallel to said resistive element, and a processor electrically connected to said switching element. The processor is configured to determine a load voltage and set a pulse width modulation duty cycle based on the determined voltage.

In another aspect, a method for operating a motor configured to operate at a variable average speed under pulse-width modulation control is provided. The method comprises the steps of energizing the motor, and setting an average speed by superimposing a sweep frequency onto an average pulse-width modulation frequency.

In another aspect, a motor is provided. The motor comprises a housing, and a stator mounted in said housing, said stator comprising a stator bore. A rotor is rotatably mounted at least partially within said stator bore, and a processor electrically connected to at least one of said stator and said rotor. The processor is configured to determine a load voltage, and set a pulse width modulation duty cycle based on the determined voltage.

In another aspect, a motor comprises a housing, a stator mounted in said housing, said stator comprising a stator bore, and a rotor rotatably mounted at least partially within said stator bore. A processor is electrically connected to at least one of said stator and said rotor, and the processor is configured to set an average speed by superimposing a sweep frequency onto an average pulse-width modulation frequency.

In another aspect, a refrigerator is provided which comprises a housing, a freezer section at least partially within said housing, a fresh food section at least partially within said housing, a motor at least partially within said housing; and a processor electrically connected to said motor, said processor configured to set an average speed by superimposing a sweep frequency onto an average pulse-width modulation frequency.

In another aspect, a refrigerator is provided that comprises a housing, a freezer section at least partially within said housing, a fresh food section at least partially within said housing, a motor at least partially within said housing, and a processor electrically connected to said motor. The processor is configured to determine a load voltage; and set a pulse width modulation duty cycle based on the determined voltage.

DETAILED DESCRIPTION OF THE INVENTION

Figure 1:
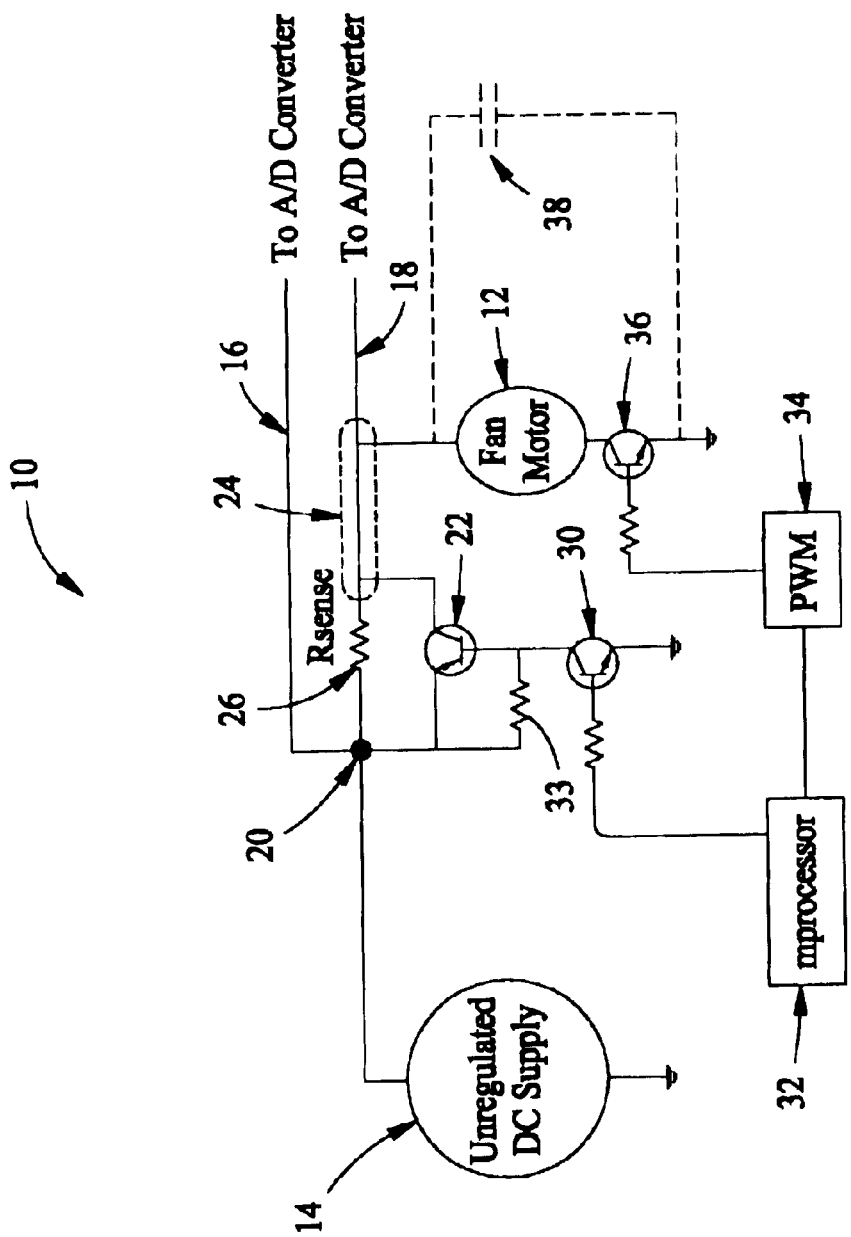
FIG. 1 is a diagram of one embodiment of a closed-loop motor control system.

FIG. 1 is a diagram of one embodiment of a closed-loop motor control system 10. As explained in greater detail below, system 10 provides closed loop motor control without using a Hall effect device or a voltage regulator. Rather, system 10 utilizes a plurality of switching elements and resistive elements to provide closed-loop motor control.

Control system 10 includes a fan motor 12 that operates in a refrigerator (not shown in FIG. 1), such as, for example, a condenser fan motor or an evaporator fan motor. Control system 10 is powered by an unregulated DC power supply 14. Power supply 14 supplies power to other loads in addition to control system 10. Additionally, analog voltage signals from supply 14 are transmitted via a first line 16 to an analog-to-digital converter (ADC) (not shown). A second line 18 is also connected to the ADC.

Line 16 is electrically connected at a connection node 20 to a switching element 22, e.g. a PNP transistor. PNP transistor 22 is also electrically connected to line 18 at a connection node 24 such that PNP transistor 22 is between lines 16 and 18 allowing for an opening and closing of current flow between nodes 20 and 24 through transistor 22. For example, PNP transistor 22 emitter and collector terminals are connected to nodes 20 and 24 respectively. A resistive element 26, e.g. a sense resistor in line 18, is connected to nodes 20 and 24 in parallel with the emitter and collector terminals of transistor 22. Fan motor 12 receives a load voltage at node 24. A second switch 30 is connected between a base of transistor 22 and a processor 32, e.g. a Hitachi model H8-3644 processor commercially available from Hitachi, Ltd., Tokyo, Japan. Processor 32 is operationally coupled to the ADC. In one embodiment, switch 30 is a NPN transistor including a collector terminal electrically connected to a base terminal of PNP transistor 22. NPN transistor 30 further includes a base terminal electrically connected to processor 32. A resistor 33 connects the base of PNP transistor 22 to the emitter of PNP transistor 22. It should be understood that the present invention can be practiced with many alternative processors, and is not limited to practice in connection with just processor 32. Therefore, and as used herein, the term "processor" is not limited to just those integrated circuits referred to in the art as processors, but broadly refers to computers, processors, microprocessors, microcontrollers, microcomputers, application specific integrated circuits, and other programmable circuits including programmable logic controllers (PLCs).

Circuit 10 further includes a PWM control sub-circuit 34 connected to processor 32. In one embodiment, PWM control sub-circuit 34 is a module within a Hitachi H8-3644 processor or other known microprocessor. PWM circuit 34 is electrically connected to fan motor 12 via a transistor 36. Although control system 10 includes transistors including bipolar transistors, control system 10 can utilize many alternative switching and current- or voltage-controlling elements, e.g. relays and Field Effect Transistors (FETs), such as, for example, Metal Oxide Semiconductor Field Effect Transistors (MOSFETs) and Junction FETs (JFETs).

In use, control system 10 performs closed-loop speed control and diagnostic functions as directed by processor 32. To control the speed of fan motor 12, processor 32 bypasses sense resistor 26 by turning on PNP transistor 22. Processor 32 measures the load voltage of motor 12 at node 24, and a duty cycle for PWM circuit 34 is set based on the load voltage measured at node 24.

For example, in an illustrative embodiment, it may be appreciated that the power supply voltage is approximately equal to the sum of $V_{in}$ at node 24 and the applied voltage of PWM control sub-circuit 34. Thus, assuming a minimum power supply voltage of 12 volts, PWM sub-circuit voltage is approximately $V_{in}$ minus 12 volts. An appropriate duty cycle may be therefore be mathematically derived according to known theoretical or empirically determined relationships between an applied voltage signal from PWM control sub-circuit 34 and motor voltage, motor voltage and A/D converter counts, and output voltage at node 24 in relation to input voltage from power supply 14. For instance, in one exemplary embodiment, the duty cycle for PWM circuit 34 is governed by the following relationship:

DutyCycle=$3 \times 10^{-5}(V_{in}-12)^4 - 0.0019(V_{in}-12)^3 + 0.0433(V_{in}-12)^2 - 0.4198(V_{in}-12)+1.4591$ In different embodiments, the duty cycle is calculated directly by processor 32 according to such a relationship, or a pre-calculated duty cycle value corresponding to the sensed voltage is selected from a plurality of pre-calculated values associated with the processor, such as in a lookup table familiar to those in the art.

The above-described process is performed sequentially and repeatedly while motor 12 is in an on state.

Processor 32 controls all devices receiving power from power supply 14. To test the electrical functionality of fan motor 12, processor 32 switches off all electrical loads on power supply 14. After all loads are shed from power supply 14, processor 32 switches PNP transistor 22 to an off state allowing a measurable voltage drop across sense resistor 26 whenever current flows from node 20 to node 24. PWM circuit 34 then energizes motor 12 using a duty cycle of 100 percent (PWM signal is kept high). Processor 32 then measures respective analog voltages from lines 16 and 18 and determines power consumption by sense resistor 26, in accordance with the following relationship;

$$\frac{[(\text{Upper\_A/D\_Reading}) - (\text{Lower\_A/D\_Reading})]^2}{Rsense}$$

where Upper_A/D_Reading is the supply voltage measured from line 16, Lower_A/D_Reading is the motor load voltage measured from line 18, and Rsense is a resistance in ohms of sense resistor 26. Rsense, in one embodiment, is selected to produce current values of between about 1 mA and about 100 mA through resistor 26. Processor 32 also provides for switching from motor functionality diagnosis to closed loop control. For example, after diagnosing that the motor functionality is within a predetermined operating range, i.e., that the motor is energized and not locked, processor 32 switches PNP transistor 22 to an on state and controls motor 12 as explained above.

In a further embodiment, a filter 38 (shown in phantom in FIG. 1) is employed between motor 12 and ground to reduce undesirable disturbances attributable to effects caused by the PWM wave form.

The above described motor speed control circuit provides for constant fan speed control with diagnostic capabilities using an unregulated power supply. Through reduction in parts, compared to at least one known speed sensor system, an increase in reliability is facilitated. Also, as explained in greater detail below, using a fast frequency sweep over a slowly adjustable average frequency in a PWM controlled variable speed fan motor control system facilitates a reduction in the inherent motor and fixture resonances which can cause noise.

Figure 2:
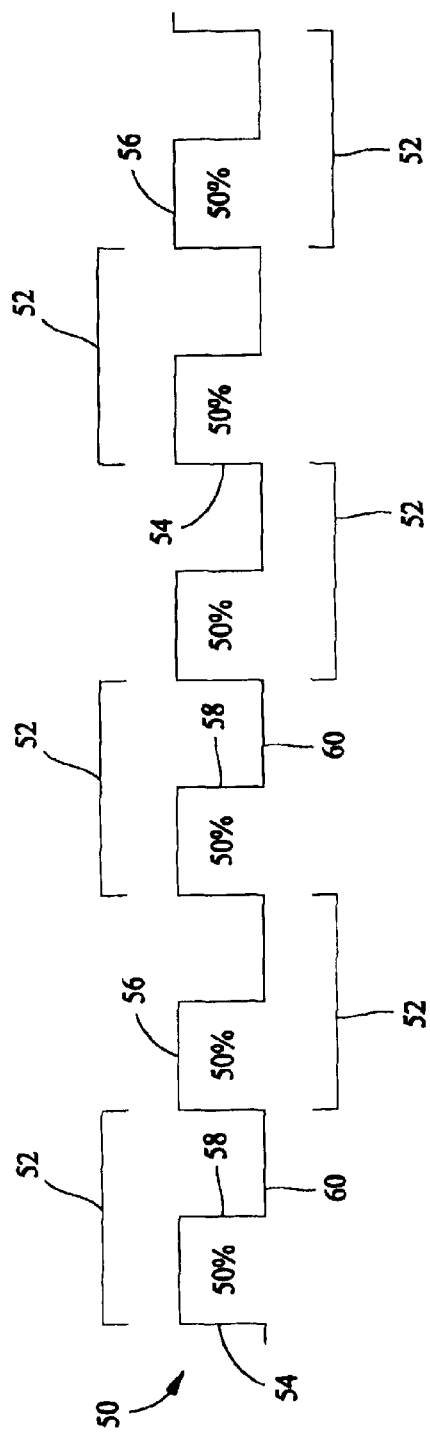
FIG. 2 is a representation of a waveform produced by a conventional PWM circuit for a fifty-percent duty cycle.

FIG. 2 is a representation of a waveform 50 produced by a conventional PWM circuit for a fifty percent duty cycle. Waveform 50 includes a plurality of individual waves 52. Each wave 52 includes a leading edge 54, a high portion 56, a trailing edge 58, and a low portion 60. Each wave 52 is substantially identical to each other wave 52.

During operation of a PWM controlled motor, the motor is energized during high portions 56 and is not energized during low portions 60. Since each high portion 56 constitutes one-half of each wave 52, the motor is operating at a 50% duty cycle. Typically, in a PWM controlled system, the duty cycle is adjusted based on various factors, such as, for example, a desired cooling rate. As a result, the motor may be modulated at one or more mechanical resonance frequencies causing increased perceived noise to the consumer. For instance, a motor having a mechanical resonance frequency at a 50% duty cycle will resonate when controlled with waveform 50 and produce more noise than when operated at a duty cycle not corresponding to a mechanical resonance frequency.

Figure 3:
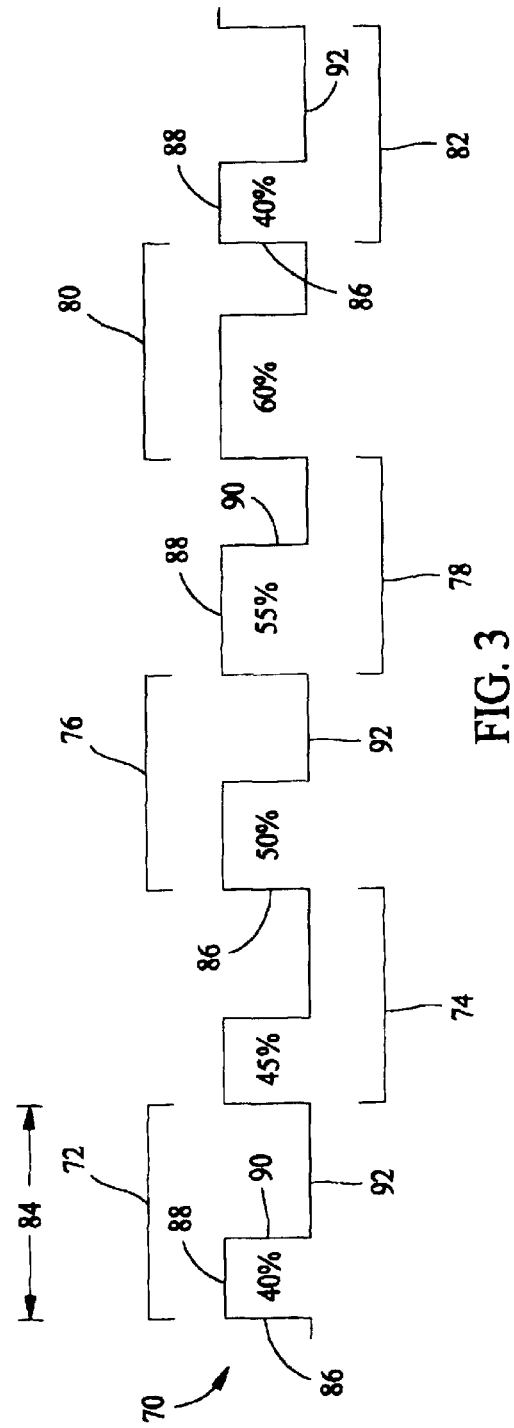
FIG. 3 is a representation of a monotonically increasing waveform.

FIG. 3 is a representation of a monotonically increasing waveform 70. Waveform 70 includes a first wave 72, a second wave 74, a third wave 76, a fourth wave 78, a fifth wave 80, and a sixth wave 82. Each wave 72, 74, 76, 78, 80, and 82 has a substantially similar period 84 and includes a leading edge 86, a high portion 88, a trailing edge 90, and a low portion 92. High portion 88 of first wave 72 is approximately 40% of period 84. High portion 88 of second wave 74 is approximately 45% of period 84. High portion 88 of third wave 76 is approximately 50% of period 84. High portion 88 of fourth wave 78 is approximately 55% of period 84. High portion 88 of fifth wave 80 is approximately 60% of period 84. High portion 88 of sixth wave 82 is approximately 40% of period 84. High portions 88 vary from 40% to 60% and average 50%, which is the duty cycle. Specifically high portions 88 vary from a low value of approximately 10 percent below the average (50%) and monotonically increase to a high value of approximately 10 percent above the average forming a sweep action before returning to the low value and sweeping again. The average is the duty cycle. In an alternative embodiment, the high value is approximately 20% above the average and the low value is approximately 20% below the average. In another embodiment, the high and low values are approximately 5% above and below the average respectively. In yet another embodiment, the high and low values are more than 20% above and below the average respectively. In a further embodiment, the high and low values are less than 5% above and below the average respectively.

During operation of a PWM controlled motor (not shown in FIG. 3), the motor is energized during high portions 88 and not energized during low portions 92. Since an average of high portions 88 is 50%, the motor is operating at a 50% duty cycle. However, the sweep action distributes the excitation energy over a large frequency band i.e., a twenty-percent range from a 40% duty cycle to a 60% duty cycle. Accordingly, the resonance energy at any particular frequency is lowered and the resonant system has less time to build up an appreciable resonance and associated noise. Because a motor has a large inertia compared to the fast sweep rate, the speed of a motor controlled with waveform 70 is substantially similar to the speed of a motor controlled with waveform 50 (shown in FIG. 2). However, as explained above, waveform 70 distributes the excitation energy over multiple frequencies, facilitating a reduction in the occurrences of modulating the motor at a resonance frequency.

In one embodiment, processor 32 determines an average speed and outputs a PWM waveform as is known in the art e.g. waveform 50. PWM circuit 34 superimposes a plurality of sweep additions and subtractions while maintaining the average set by processor 32. In another embodiment, processor 32 and PWM circuit 34 are integrated into a single chip (not shown). The single chip determines an average speed value and outputs a monotonically increasing waveform centered around the determined value. It is contemplated that the benefits of distributing the excitation energy over multiple frequencies to facilitate a reduction in resonations accrue to systems and methods utilizing a monotonically decreasing waveform centered around the average. For example, waveform 70 can be reflected about a horizontal axis and waves 72, 74, 76, 78, and 80 sent in reverse order. The motor is sent fifth wave 80 followed by fourth wave 78, third wave 76, second wave 74, and finally first wave 72 before starting again with fifth wave 80. Accordingly, the motor receives a monotonically decreasing waveform while still maintaining a 50% duty cycle.

Additionally, a random waveform centered around the average will also distribute the excitation energy over multiple frequencies and facilitate a reduction in resonations. For example, sending waves 72, 74, 76, 78, and 80 randomly to a motor energizes the motor with a 50% duty cycle and facilitates a reduction in resonations by distributing the energy over different frequencies. In one embodiment, PWM circuit 34 includes a random number generator (not shown) and utilizes the random number generator to generate random numbers between a negative limit and a positive limit with the same absolute value as the negative limit. Each random number is added to the average and thus the motor is regulated at a duty cycle set by processor 32 and a reduction in resonations is facilitated by distributing the excitation energy over multiple frequencies.

Figure 4:
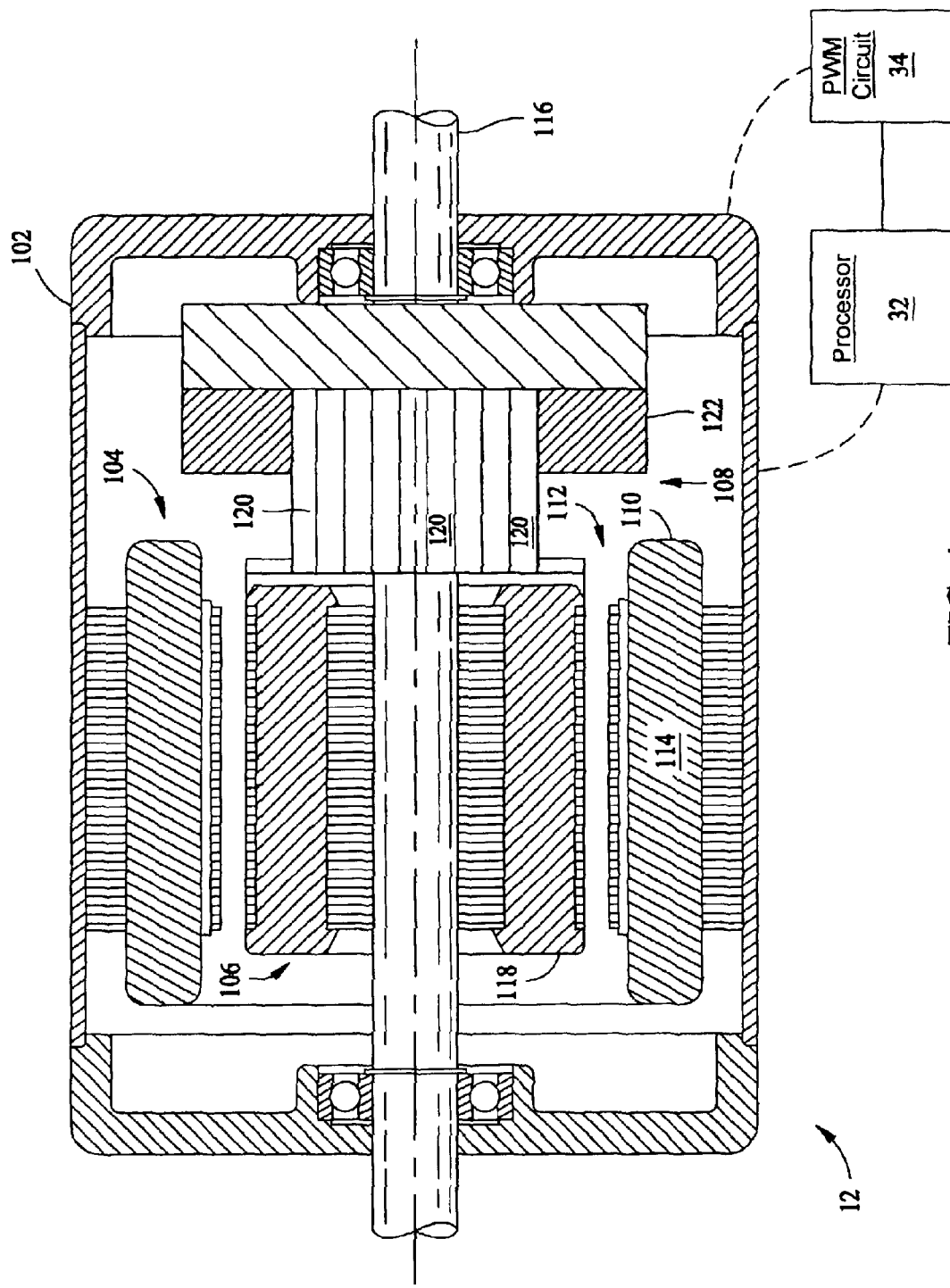
FIG. 4 is a cross-sectional view of the closed-loop PWM controlled motor shown in FIG. 1.

FIG. 4 is a cross-sectional view of closed-loop PWM controlled motor 12 (shown in FIG. 1) including a housing 102, a stator assembly 104, a rotor assembly 106, and a commutator assembly 108. Stator assembly 104 is located within housing 102 and includes a stator core 110 including a stator bore 112 for receiving rotor assembly 106. Stator core 110 further includes a plurality of wound field poles 114. Rotor assembly 106 includes rotor shaft 116 carrying commutator assembly 108 and an armature core 118. Commutator assembly 108 includes a plurality of commutator bars 120 and a brush holder 122 including a plurality of brushes (not shown). Commutator assembly 108 further includes a plurality of insulator segments (not shown) arranged alternately with commutator bars 120 in a circumferential direction of rotor shall 116. In an alternative embodiment, motor 12 is an electronic DC motor and does not include commutator assembly 108. Motor 12 is electrically connected to processor 32 and PWM control sub-circuit 34 as shown in FIG. 1.

During motor operation, processor 32 controls motor 12 as explained above and outputs a PWM control signal. Additionally, PWM circuit 34 receives the PWM control signal and superimposes a plurality of sweep additions and subtractions to the PWM control signal while maintaining the average set by processor 32. Accordingly, motor 12 is controlled with a closed loop motor control with out using a Hall effect device or a voltage regulator. Additionally, a reduction in resonance is facilitated by the superimposition of the sweep additions and subtractions.

Figure 5:
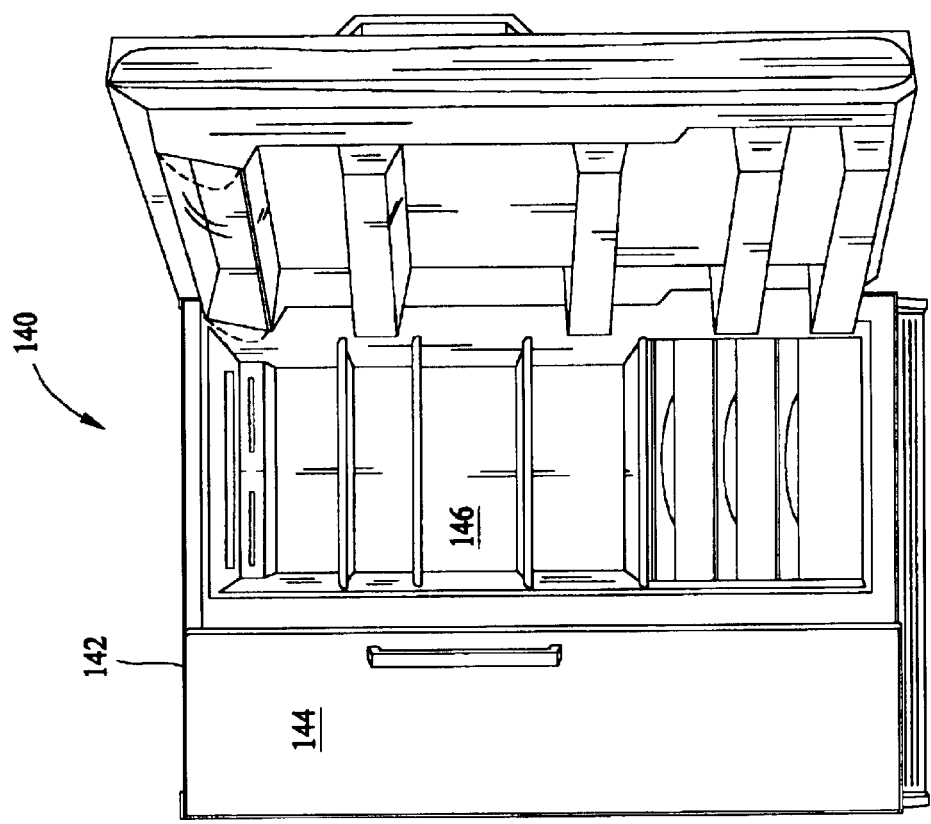
FIG. 5 is a front view of a refrigerator.

FIG. 5 is a front view of a refrigerator 140 including a housing 142, a freezer section 144, and a fresh food section 146. Refrigerator 140 further includes motor 12 (shown in FIG. 4) mounted within housing 142. Motor 12 is electrically connected to processor 32 and PWM control sub-circuit 34 as shown in FIG. 1.

During operation of refrigerator 140, processor 32 controls motor 12 as explained above and outputs a PWM control signal. Additionally, PWM circuit 34 receives the PWM control signal and superimposes a plurality of sweep additions and subtractions to the PWM control signal while maintaining the average set by processor 32. Accordingly, motor 12 is controlled with a closed loop motor control with out using a Hall effect device or a voltage regulator. Additionally, a reduction in resonance is facilitated by the superimposition of the sweep additions and subtractions. Accordingly, a reduction of noise generated by refrigerator 140 is facilitated.

While the invention has been described in terms of various specific embodiments, those skilled in the art will recognize that the invention can be practiced with modification within the spirit and scope of the claims.

What is claimed is:

1. A method for controlling speed in a pulse-width-modulation-controlled motor powered by a load voltage source, said method comprising the steps of:

diagnosing functionality of the motor;
measuring the motor load voltage, wherein said step of measuring the motor load voltage further comprises utilizing at least one switching element to bypass a resistive element; and
setting pulse-width modulation duty cycles based on the measured voltage, wherein an average of frequencies of the pulse-width modulation duty cycles is a predetermined average pulse-width modulation frequency of the motor.

2. A method in accordance with claim 1 wherein said steps are sequentially executed and repeated automatically while the motor is in an on state.

3. A method for controlling speed in a pulse-width-modulation-controlled motor powered by a load voltage source, said method comprising the steps of:
measuring the motor load voltage, wherein a supply voltage provides the load voltage;
setting pulse-width modulation duty cycles based on the measured voltage, wherein an average of frequencies of the pulse-width modulation duty cycles is a predetermined average pulse-width modulation frequency of the motor; and
diagnosing motor functionality using a difference between the supply voltage and the load voltage.

4. A method in accordance with claim 3 wherein the supply voltage is unregulated.

5. a method in accordance with claim 3 wherein the supply voltage is direct current.

6. A method for controlling speed in a pulse-width-modulation-controlled motor powered by a load voltage, the load voltage supplied by a supply voltage, said method comprising the steps of:
diagnosing motor functionality using a difference between the supply voltage and the load voltage;
switching from motor functionality diagnosis to motor speed control; and
setting an average speed of the motor by superimposing sweep frequencies onto an average pulse-width frequency, the average pulse-width frequency being a predetermined average of the sweep frequencies.

7. A method in accordance with claim 6 wherein said step of diagnosing motor functionality comprises the step of using a pulse width modulation duty cycle of 100 percent.

8. A method in accordance with claim 6 wherein said step of diagnosing motor functionality using a difference between the supply voltage and the load voltage comprises calculating power used by the motor in accordance with:

$$\frac{[(Upper\_A/D\_Reading) - (Lower\_A/D\_Reading)]^2}{Rsense}$$

where Upper_A/D Reading is the supply voltage measurement, Lower_A/D_Reading is the load voltage measurement, and Rsense is a resistance between measurement locations for Upper_A/D_Reading and Lower_A/D_Reading.

9. A closed loop motor control system, said system comprising:
a motor;
a power source;
a resistive element electrically coupling said motor to said power source;
at least one switching element electrically coupling said motor to said power source in parallel to said resistive element; and
a processor electrically connected to said switching element, said processor configured to:
diagnose functionality of said motor;
determine a load voltage of said motor; and
set a pulse width modulation duty cycle based on the determined voltage.

10. A closed loop system in accordance with claim 9 wherein said processor further configured to:
determine the load voltage while the motor is in an on state repeatedly automatically; and
set a pulse width modulation duty cycle based on the determined voltage while the motor is in an on state repeatedly automatically.

11. A closed loop system in accordance with claim 9 wherein said processor further configured to diagnose functionality of said motor by using a pulse width modulation duty cycle of 100 percent.

12. A closed loop system in accordance with claim 9 wherein said processor further configured to diagnose functionality of said motor by calculating power used by the motor in accordance with:

$$\frac{[(Upper\_A/D\_Reading) - (Lower\_A/D\_Reading)]^2}{Rsense}$$

where Upper_A/D_Reading is a supply voltage measurement, Lower_A/D_Reading is a load voltage measurement, and Rsence is a resistance between measurement locations for Upper_A/D_Reading and Lower_A/D_Reading.

13. A system in accordance with claim 9 wherein said power source comprises an unregulated voltage supply.

14. A system in accordance with claim 13 wherein said unregulated voltage supply comprises an unregulated DC voltage supply.

15. A method for operating a motor configured to operate at a variable average speed wider pulse-width modulation control, said method comprising the steps of:
energizing the motor; and
setting an avenge speed by superimposing sweep frequencies onto an average pulse-width modulation frequency, the average pulse-width modulation frequency being a predetermined average of the sweep frequencies.

16. A method in accordance with claim 15 wherein said step of setting an average speed further comprises the step of setting an average speed by superimposing a sweep frequency range onto an average pulse-width modulation frequency forming a monotonically increasing waveform.

17. A method in accordance with claim 15 wherein said step of setting an average speed further comprises the step of setting an average speed by superimposing a sweep frequency range onto an average pulse-width modulation frequency forming a monotonically decreasing waveform.

18. A method in accordance with claim 15 wherein said step of setting an average speed further comprises the step of setting an average speed by superimposing a sweep frequency range onto an average pulse-width modulation frequency forming a random waveform centered around the average pulse-width modulation frequency.

19. A method in accordance with claim 15 wherein said step of setting an average speed further comprises the step of setting an average speed by superimposing a sweep frequency range onto an average pulse-width modulation frequency forming a monotonically increasing waveform with a low value approximately 20% below the average and a high value approximately 20% above the average.

20. A method in accordance with claim 15 wherein said step of setting an average speed further comprises the step of setting an average speed by superimposing a sweep frequency range onto an average pulse-width modulation frequency forming a monotonically increasing waveform with a low value approximately 20% below the average and a high value approximately 20% above the average.

21. A method in accordance with claim 15 wherein said step of setting an average speed further comprises the step of setting an average speed by superimposing a sweep frequency range onto an average pulse-width modulation frequency forming a random waveform centered around the average pulse-width modulation frequency with a low value approximately 20% below the average and a high value approximately 20% above the average.

22. A method in accordance with claim 15 wherein said step of setting an average speed further comprises the step of setting an average speed by superimposing a sweep frequency range onto an average pulse-width modulation frequency forming a monotonically increasing waveform with a low value at least approximately 5% below the average and high value at least approximately 5% above the average.

23. A method in accordance with claim 15 wherein said step of setting an average speed further comprises the step of setting an average speed by superimposing a sweep frequency range onto an average pulse-width modulation frequency forming a monotonically decreasing waveform with a low value at least approximately 5% below the average and a high value at least approximately 5% above the average.

24. A method in accordance with claim 15 wherein said step of setting an average speed further comprises the step of setting an average speed by superimposing a sweep frequency range onto an average pulse-width modulation frequency forming a random waveform centered around the average pulse-width modulation frequency with a low value at least approximately 5% below the average and a high value at least approximately 5% above the average.

25. A motor comprising:
a housing;
a stator mounted in said housing, said stator comprising a stator bore;
a rotor rotatably mounted at least partially within said stator bore; and
a processor electrically connected to at least one of said stator and said rotor, said processor configured to:
determine a load voltage; and
set an average speed of the motor by superimposing sweep frequencies onto an average pulse-width frequency, the average pulse-width frequency being a predetermined average of the sweep frequencies.

26. A motor in accordance with claim 25 wherein said processor further configured to diagnose functionality of said motor.

27. A motor in accordance with claim 26 wherein said processor further configured to diagnose functionality of said motor by calculating power use in accordance with:

$$\frac{[(Upper\_A/D\_Reading) - (Lower\_A/D\_Reading)]^2}{Rsense}$$

where Upper_A/D_Reading is a supply voltage measurement, Lower_A/D_Reading is a load voltage measurement, and Rsense is a resistance between measurement locations for Upper_A/D_Reading and Lower_A/D_Reading.

28. A motor comprising:
a housing;
a stator mounted in said housing, said stator comprising a stator bore;
a rotor rotatably mounted at least partially within said stator bore; and
a processor electrically connected to at least one of said stator and said rotor, said processor configured to set an average speed by superimposing sweep frequencies onto an average pulse-width modulation frequency, wherein the average pulse-width modulation frequency is a predetermined average of the sweep frequencies.

29. A motor in accordance with claim 28 wherein said processor further configured to set an average speed by superimposing a sweep frequency range onto an average pulse-width modulation frequency forming a monotonically increasing waveform.

30. A motor in accordance with claim 28 wherein said processor further configured to set un average speed by superimposing a sweep frequency range onto an average pulse-width modulation frequency forming a monotonically decreasing waveform.

31. A motor in accordance with claim 28 wherein said processor further configured to set an average speed by superimposing a sweep frequency range onto an average pulse-width modulation frequency forming a random waveform centered around the average pulse-width modulation frequency.

32. A motor in accordance with claim 28 wherein said processor further configured to set an average speed by superimposing a sweep frequency range onto an average pulse-width modulation frequency forming a monotonically increasing waveform with a low value approximately 20% below the average and a high value approximately 20% above the average.

33. A motor in accordance with claim 28 wherein said processor further configured to set an average speed by superimposing a sweep frequency range onto an average pulse-width modulation frequency forming a monotonically decreasing waveform with a low value approximately 20% below the average and a high value approximately 20% above the average.

34. A motor in accordance with claim 28 wherein said processor further configured to set an average speed by superimposing a sweep frequency range onto an average pulse-width modulation frequency forming a random waveform centered around the average pulse-width modulation frequency with a low value approximately 20% below the average and a high value approximately 20% above the average.

35. A motor in accordance with claim 28 wherein said processor further configured to set an average speed by superimposing a sweep frequency range onto an average pulse-width modulation frequency forming a monotonically increasing waveform with a low value at least approximately 5% below the average and a high value at least approximately 5% above the average.

36. A motor in accordance with claim 28 wherein said processor further configured to set an average speed by superimposing a sweep frequency range onto an average pulse-width modulation frequency forming a monotonically decreasing waveform with a low value at least approximately 5% below the average and a high value at least approximately 5% above the average.

37. A motor in accordance with claim 28 wherein said processor further configured to set an average speed by superimposing a sweep frequency range onto an average pulse-width modulation frequency forming a random waveform centered around the average pulse-width modulation frequency with a low value at least approximately 5% below the average and a high value at least approximately 5% above the average.

38. A refrigerator comprising:

a housing;

a freezer section at least partially within said housing;

a fresh food section at least partially within said housing;

a motor at least partially within said housing; and a processor electrically connected to said motor, said processor configured to set an average speed of the motor by superimposing sweep frequencies onto an average pulse-width modulation frequency, wherein the average pulse-width modulation frequency is a predetermined average of the sweep frequencies.

39. A refrigerator in accordance with claim 38 wherein said processor further configured to set an average speed by superimposing a sweep frequency range onto an average pulse-width modulation frequency forming a monotonically increasing waveform.

40. A refrigerator in accordance with claim 38 wherein said processor further configured to set an average speed by superimposing a sweep frequency range onto an average pulse-width modulation frequency forming a monotonically decreasing waveform.

41. A refrigerator in accordance with claim 38 wherein said processor further configured to set an average speed by superimposing a sweep frequency range onto an average pulse-width modulation frequency forming a random waveform centered around the average pulse-width modulation frequency.

42. A refrigerator in accordance with claim 38 wherein said processor further configured to set an average speed by superimposing a sweep frequency range onto an average pulse-width modulation frequency forming a monotonically increasing waveform with a low value approximately 20% below the average and a high value approximately 20% above the average.

43. A refrigerator in accordance with claim 38 wherein said processor further configured to set an average speed by superimposing a sweep frequency range onto an average pulse-width modulation frequency forming a monotonically decreasing waveform with a low value approximately 20% below the average and a high value approximately 20% above the average.

44. A refrigerator in accordance with claim 38 wherein said processor further configured to set an average speed by superimposing a sweep frequency range onto an average pulse-width modulation frequency forming a random waveform centered around the average pulse-width modulation frequency with a low value approximately 20% below the average and a high value approximately 20% above the average.

45. A refrigerator in accordance with claim 38 wherein said processor further configured to set an average speed by superimposing a sweep frequency range onto an average pulse-width modulation frequency forming a monotonically increasing waveform with a low value at least approximately 5% below the average and a high value at least approximately 5% above the average.

46. A refrigerator in accordance with claim 38 wherein said processor further configured to set an average speed by superimposing a sweep frequency range onto an average pulse-width modulation frequency forming a monotonically decreasing waveform with a low value at least approximately 5% below the average and a high value at least approximately 5% above the average.

47. A refrigerator in accordance with claim 38 wherein said processor further configured to sat an average speed by superimposing a sweep frequency range onto an average pulse-width modulation frequency forming a random waveform centered around the average pulse-width modulation frequency with a low value at least approximately 5% below the average and a high value at least approximately 5% above the average.

48. A refrigerator comprising:

a housing;

a freezer section at least partially within said housing;

a fresh food section at least partially within said housing;

a motor at least partially within said housing; and a processor electrically connected to said motor, said processor configured to:

determine a load voltage; and set an average speed of the motor by superimposing sweep frequencies onto an average pulse width frequency, the avenge pulse-width frequency being a predetermined average of the sweep frequencies.

49. A refrigerator in accordance with claim 48 wherein said processor further configured to diagnose functionality of said motor.

50. A motor in accordance with claim 49 wherein said processor further configured to diagnose functionality of said motor by calculating power use in accordance with:

$$\frac{[(\text{Upper\_A/D\_Reading}) - (\text{Lower\_A/D\_Reading})]^2}{Rsense}$$

where Upper_A/D_Reading is a supply voltage measurement Lower_A/D_Reading is a load voltage measurement, and Rsense is a resistance between measurement locations for Upper_A/D_Reading and Lower_A/D_Reading.

* * * * *

UNITED STATES PATENT AND TRADEMARK OFFICE
CERTIFICATE OF CORRECTION

PATENT NO. : 6,762,577 B2
DATED : July 13, 2004
INVENTOR(S) : Gray et al.

It is certified that error appears in the above-identified patent and that said Letters Patent is hereby corrected as shown below:

Title page,
Item [75], Inventors, delete "Steven Gray, Prospect, KY" and insert therefor -- Steven James Gray, Erie, PA --; and
after "Wolfgang Daum," delete "Louisvillie, KY" and insert therefor -- Erie, PA --.

Column 9,
Line 5, delete "increasing" and insert therefor -- decreasing --.

Signed and Sealed this

Twenty-ninth Day of November, 2005

JON W. DUDAS
*Director of the United States Patent and Trademark Office*